United States Patent
Kim et al.

(10) Patent No.: US 10,990,852 B1
(45) Date of Patent: Apr. 27, 2021

(54) METHOD AND APPARATUS FOR TRAINING MODEL FOR OBJECT CLASSIFICATION AND DETECTION

(71) Applicant: SAMSUNG SDS CO., LTD., Seoul (KR)

(72) Inventors: Byoung-Jip Kim, Seoul (KR); Jong-Won Choi, Seoul (KR); Young-Joon Choi, Seoul (KR); Seong-Won Bak, Seoul (KR); Ji-Hoon Kim, Seoul (KR)

(73) Assignee: SAMSUNG SDS CO., LTD, Seoul (KR)

( * ) Notice: Subject to any disclaimer, the term of this patent is extended or adjusted under 35 U.S.C. 154(b) by 63 days.

(21) Appl. No.: 16/666,051

(22) Filed: Oct. 28, 2019

(30) Foreign Application Priority Data

Oct. 23, 2019 (KR) .......................... 10-2019-0132151

(51) Int. Cl.
*G06K 9/62* (2006.01)
*G06K 9/32* (2006.01)

(52) U.S. Cl.
CPC ......... *G06K 9/6257* (2013.01); *G06K 9/3275* (2013.01); *G06K 9/6231* (2013.01); *G06K 9/6259* (2013.01); *G06K 2209/21* (2013.01)

(58) Field of Classification Search
CPC .. G06K 9/6257; G06K 9/3275; G06K 9/6231; G06K 9/6259; G06K 2209/21
See application file for complete search history.

(56) References Cited

U.S. PATENT DOCUMENTS

| | | | | |
|---|---|---|---|---|
| 10,664,722 | B1* | 5/2020 | Sharma | G06K 9/6256 |
| 2017/0364733 | A1* | 12/2017 | Estrada | G06N 3/0454 |
| 2018/0129930 | A1 | 5/2018 | Shin et al. | |
| 2018/0285663 | A1* | 10/2018 | Viswanathan | G06K 9/00818 |

* cited by examiner

*Primary Examiner* — David F Dunphy
(74) *Attorney, Agent, or Firm* — The PL Law Group, PLLC

(57) ABSTRACT

A method of training a model for object classification and detection includes training a first classification model including a shared feature extractor shared by classification models and a first classifier for outputting a result of an object in a first input image based on feature values of the first input image, training a second classification model including the shared feature extractor and a second classifier for outputting a result about authenticity of a second input image based on feature values of the second input image, and training a third classification model including the shared feature extractor and a third classifier for outputting a classification result about a rotation angle of a third input image on the basis of feature values of the third input image extracted by the shared feature extractor, using a third training image set including images rotated at one or more angles.

18 Claims, 6 Drawing Sheets

METHOD AND APPARATUS FOR TRAINING MODEL FOR OBJECT CLASSIFICATION AND DETECTION

CROSS REFERENCE TO RELATED APPLICATIONS AND CLAIM OF PRIORITY

This application claims the benefit of Korean Patent Application No. 10-2019-0132151 filed on Oct. 23, 2019 in the Korean Intellectual Property Office, the disclosure of which is incorporated herein by reference in its entirety

TECHNICAL FIELD

Embodiments of present invention relate to a technique of training a model for object classification and detection.

BACKGROUND ART

Generally, a training data, which is labeled with a bounding box and a class of an object existing in each image, is needed to train an object detection model. Particularly, since a lot of effort is required to display the bounding box in the image, it is difficult to obtain a large amount of training data marked with the bounding box.

To solve this problem, weakly-supervised object detection (WSOD) capable of training a model without a bounding box has been proposed recently. However, the weakly-supervised object detection has a problem of requiring a lot of images labeled with a class. Accordingly, it is required to provide a method of training an object classification model even when only a small amount of images are labeled with a class in a situation without the bounding box.

SUMMARY

Embodiments of the present invention are to provide a method and an apparatus for effectively training a model for object classification and detection.

In one general aspect, there is provided a method of training a model for object classification and detection, the method including training a first classification model including a shared feature extractor shared by a plurality of classification models and a first classifier for outputting a classification result of an object included in a first input image on the basis of feature values of the first input image extracted by the shared feature extractor, using a first training image set including an image assigned with a class; training a second classification model including the shared feature extractor and a second classifier for outputting a classification result about authenticity of a second input image on the basis of feature values of the second input image extracted by the shared feature extractor, by using a second training image set including a fake image and a real image; and training a third classification model including the shared feature extractor and a third classifier for outputting a classification result about a rotation angle of a third input image on the basis of feature values of the third input image extracted by the shared feature extractor, using a third training image set including images rotated at one or more angles.

The training of the first classification model may include training the first classification model, by using the image assigned with a class as an input data of the first classification model and the class as a target data of the first classification model.

The first classification model may further include a global average pooling (GAP) layer for outputting a location of the object in the first input image on the basis of the feature values of the first input image.

The first training image set may further include an image assigned with location information, and the training of the first classification model may include training the first classification model, by using the image assigned with a class and the image assigned with location information as an input data of the first classification model and the class and the location information as a target data of the first classification model.

The training of the second classification model may include generating the fake image by using a generative model based on a generative adversarial network (GAN).

The training of the second classification model may include training the second classification model, by using the fake image and the real image as an input data of the second classification model and authenticity corresponding to each of the fake image and the real image as a target data of the second classification model, and training the generative model to generate an image the same as the real image.

The third classification model may include an image rotator for generating the third training image set by rotating an image not assigned with a label at the one or more angles. The training of the third classification model may include training the third classification model, by using the rotated images as an input data of the third model and a rotation angle of each of the rotated images as a target data of the third model.

The first classification model, the second classification model, and the third classification model may be trained to minimize a weighted sum of a loss function of the first classification model, a loss function of the second classification model, and a loss function of the third classification model.

In another general aspect, there is provided an apparatus for training a model for object classification and detection, the apparatus comprising: a memory for storing one or more commands; and one or more processors for executing the one or more commands, wherein the one or more processors configured to train a first classification model including a shared feature extractor shared by a plurality of classification models and a first classifier for outputting a classification result of an object included in a first input image on the basis of feature values of the first input image extracted by the shared feature extractor, using a first training image set including an image assigned with a class, train a second classification model including the shared feature extractor and a second classifier for outputting a classification result about authenticity of a second input image on the basis of feature values of the second input image extracted by the shared feature extractor, by using a second training image set including a fake image and a real image, and train a third classification model including the shared feature extractor and a third classifier for outputting a classification result about a rotation angle of a third input image on the basis of feature values of the third input image extracted by the shared feature extractor, using a third training image set including images rotated at one or more angles.

The one or more processors may train the first classification model, by using the image assigned with a class as an input data of the first classification model and the class as a target data of the first classification model.

The first classification model may further include a global average pooling (GAP) layer for outputting a location of the object in the first input image on the basis of the feature values of the first input image.

The first training image set may further include an image assigned with location information, and the one or more processors may train the first classification model, by using the image assigned with a class and the image assigned with location information as an input data of the first classification model and the class and the location information as a target data of the first classification model.

The one or more processors may generate the fake image by using a generative model based on a generative adversarial network (GAN).

The one or more processors may train the second classification model, by using the fake image and the real image as an input data of the second classification model and authenticity corresponding to each of the fake image and the real image as a target data of the second classification model, and train the generative model to generate an image the same as the real image.

The third classification model may include an image rotator for generating the third training image set by rotating an image not assigned with a label at the one or more angles.

The one or more processors may train the third classification model, by using the rotated images as an input data of the third classification model and a rotation angle of each of the rotated images as a target data of the third classification model.

The first classification model, the second classification model, and the third classification model may be trained to minimize a weighted sum of a loss function of the first classification model, a loss function of the second classification model, and a loss function of the third classification model.

According to the disclosed embodiments, as a plurality of classification models sharing the same shared feature extractor is trained individually, the shared feature extractor may be sufficiently trained several times. Accordingly, since the feature extractor used for an object classification model, an object detection model and the like based on supervised learning using labeled training data is sufficiently trained, performance of the models can be enhanced. In addition, the effort, time and cost required for constructing a labeled training dataset can be reduced.

DETAILED DESCRIPTION

Figure 1:
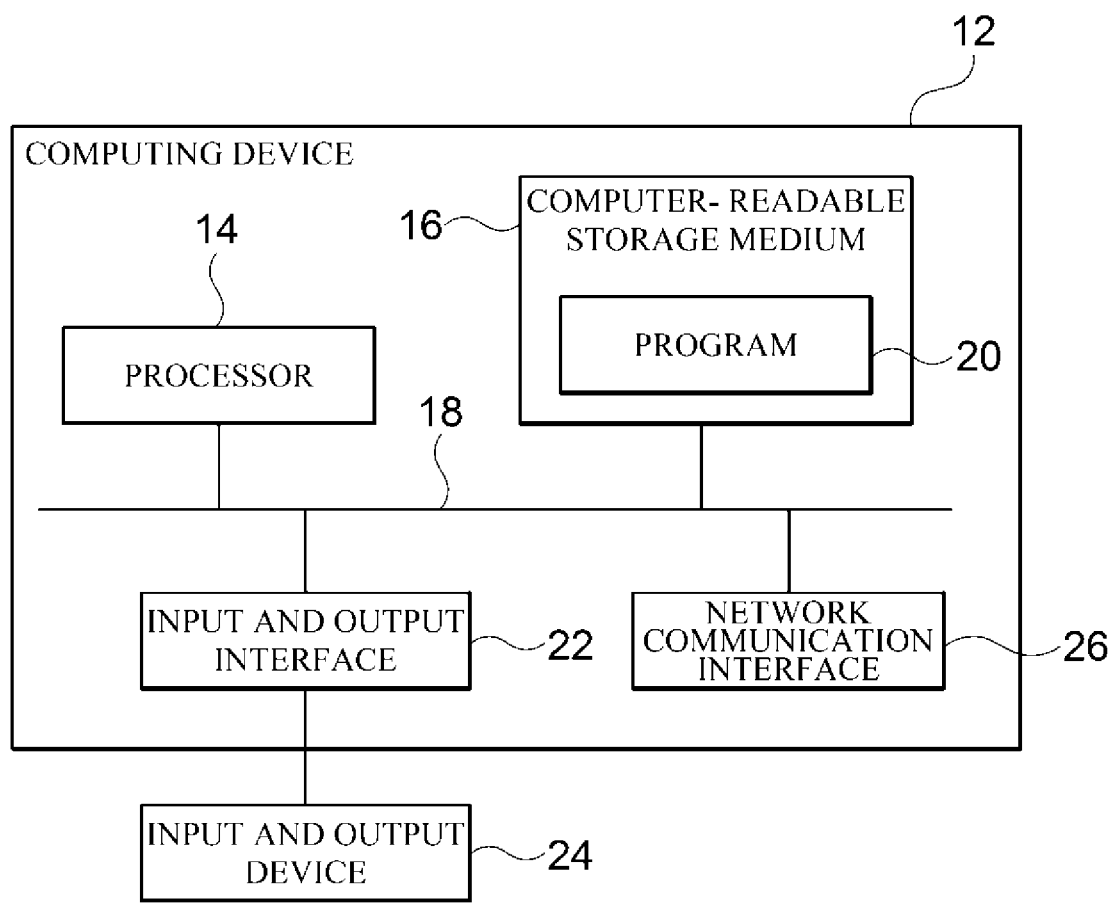
FIG. 1 is a block diagram showing an example of a computing environment including a computing device appropriate to be used in exemplary embodiments.

Hereafter, specific embodiments of the present invention will be described with reference to the accompanying drawings. The detailed description is provided below to help comprehensive understanding of the methods, apparatuses and/or systems described in this specification. However, these are only an example, and the present invention is not limited thereto.

In describing the embodiments of the present invention, when it is determined that specific description of known techniques related to the present invention unnecessarily blurs the gist of the present invention, the detailed description will be omitted. In addition, the terms described below are terms defined considering the functions of the present invention, and these may vary according to user, operator's intention, custom or the like. Therefore, definitions thereof should be determined on the basis of the full text of the specification. The terms used in the detailed description are only for describing the embodiments of the present invention and should not be restrictive. Unless clearly used otherwise, expressions of singular forms include meanings of plural forms. In the description, expressions such as "include", "provide" and the like are for indicating certain features, numerals, steps, operations, components, some of these, or a combination thereof, and they should not be interpreted to preclude the presence or possibility of one or more other features, numerals, steps, operations, components, some of these, or a combination thereof, in addition to those described above.

The neural network may use artificial neurons simplifying the functions of biological neurons, and the artificial neurons may be interconnected through connection lines having a connection weight. The connection weight, which is a parameter of the neural network, is a specific value that the connection line has and may be expressed as connection strength. The neural network may perform a recognition action or a learning process of a human being through the artificial neurons. The artificial neuron may also be referred to as a node.

The neural network may include a plurality of layers. For example, the neural network may include an input layer, a hidden layer and an output layer. The input layer may receive an input for performing learning and transfer the input to the hidden layer, and the output layer may generate an output of the neural network on the basis of the signals received from the nodes of the hidden layer. The hidden layer is positioned between the input layer and the output layer and may convert the training data transferred through the input layer into a value easy to estimate. The nodes included in the input layer and the hidden layer are connected to each other through connection lines having a connection weight, and the nodes included in the hidden layer and the output layer may also be connected to each other through connection lines having a connection weight. The input layer, the hidden layer and the output layer may include a plurality of nodes.

The neural network may include a plurality of hidden layers. The neural network including a plurality of hidden layers is referred to as a deep neural network, and training the deep neural network is referred to as deep learning. The nodes included in the hidden layer are referred to as hidden nodes. Hereinafter, training a neural network may be understood as training parameters of the neural network. In addition, a trained neural network may be understood as a neural network to which the trained parameters are applied.

At this point, the neural network may be trained using a loss function as an objective. The loss function may be an objective of the neural network for determining an optimum weight parameter through the training. The neural network may be trained for the purpose of making a result value of the loss function to be the smallest.

The neural network may be trained through supervised learning or unsupervised learning. The supervised learning is a method of inputting a training data including an input data and a target data corresponding the input data into the neural network and updating connection weights of connection lines so that the target data corresponding to the input data may be outputted. The unsupervised learning is a method of inputting only an input data into the neural network as a training data without a target data corresponding to the input data, and updating the connection weights of the connection lines to find out the features or the structure of the input data.

FIG. 1 is a block diagram showing an example of a computing environment including a computing device appropriate to be used in exemplary embodiments. In the embodiment shown in the figure, each of the components may have a different function and ability in addition to those described below, and additional components other than those described below may be included.

The computing environment 10 shown in the figure includes a computing device 12. In an embodiment, the computing device 12 may be an apparatus for training a model for object classification and detection.

The computing device 12 includes at least a processor 14, a computer-readable storage medium 16, and a communication bus 18. The processor 14 may direct the computing device 12 to operate according to the exemplary embodiments described above. For example, the processor 14 may execute one or more programs stored in the computer-readable storage medium 16. The one or more programs may include one or more computer executable commands, and the computer executable commands may be configured to direct the computing device 12 to perform operations according to the exemplary embodiment when the commands are executed by the processor 14.

The computer-readable storage medium 16 is configured to store computer-executable commands and program codes, program data and/or information of other appropriate forms. The programs 20 stored in the computer-readable storage medium 16 include a set of commands that can be executed by the processor 14. In an embodiment, the computer-readable storage medium 16 may be memory (volatile memory such as random access memory, non-volatile memory, or an appropriate combination of these), one or more magnetic disk storage devices, optical disk storage devices, flash memory devices, other forms of storage media that can be accessed by the computing device 12 and is capable of storing desired information, or an appropriate combination of these.

The communication bus 18 interconnects various different components of the computing device 12, including the processor 14 and the computer-readable storage medium 16.

The computing device 12 may also include one or more input and output interfaces 22 and one or more network communication interfaces 26, which provide an interface for one or more input and output devices 24. The input and output interfaces 22 and the network communication interfaces 26 are connected to the communication bus 18. The input and output devices 24 may be connected to other components of the computing device 12 through the input and output interfaces 22. Exemplary input and output devices 24 may include input devices such as a pointing device (a mouse, a track pad, etc.), a keyboard, a touch input device (a touch pad, a touch screen, etc.), a voice or sound input device, various kinds of sensor devices and/or photographing devices, and/or output devices such as a display device, a printer, a speaker and/or a network card. The exemplary input and output devices 24 may be included inside the computing device 12 as a component configuring the computing device 12 or may be connected to the computing device 12 as a separate apparatus distinguished from the computing device 12.

Figure 2:
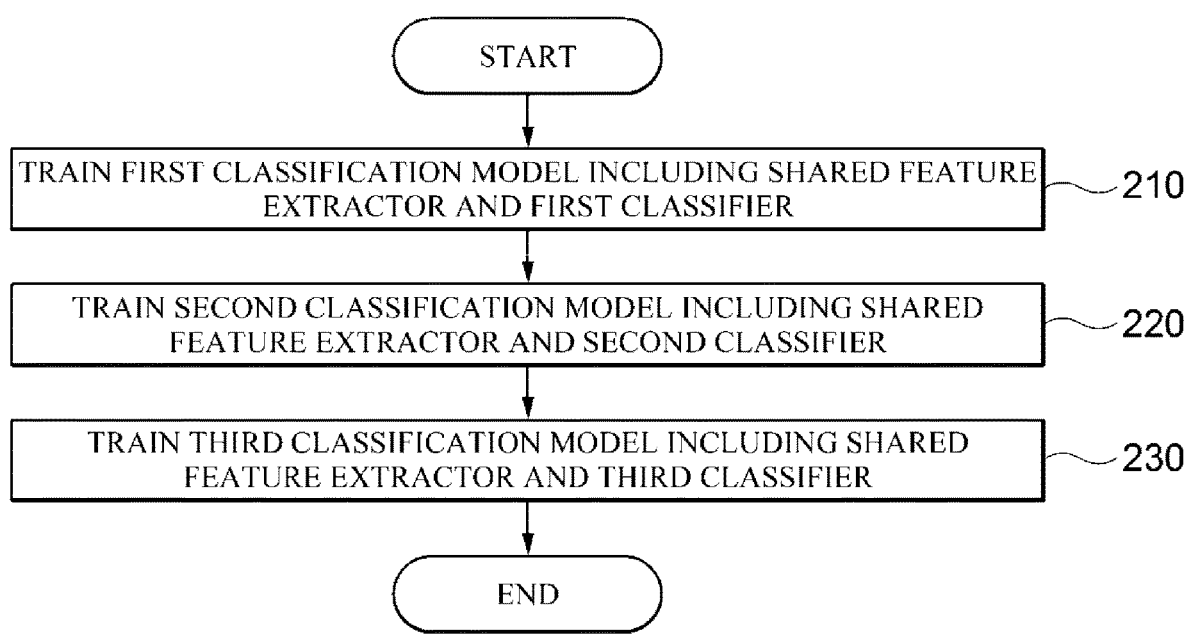
FIG. 2 is a flowchart illustrating a method of training a model for object classification and detection according to an embodiment.

FIG. 2 is a flowchart illustrating a method of training a model for object classification and detection according to an embodiment.

The method shown in FIG. 2 may be executed by the computing device 12 provided with, for example, one or more processors and a memory for storing one or more programs executed by the one or more processors. Although the method is described as being divided into a plurality of operations in the flowchart shown in the figure, at least some of the operations may be performed in a different order or in combination and together with the other operations, omitted, divided into detailed operations, or performed in accompany with one or more operations not shown in the figure.

Referring to FIG. 2, at step 210, the computing device 12 trains a first classification model including a shared feature extractor shared by a plurality of classification models and a first classifier for outputting a classification result of an object included in a first input image on the basis of feature values of the first input image extracted by the shared feature extractor, using a first training image set including an image assigned with a class. At this point, the class included in the first training image set may be assigned by a user.

The shared feature extractor may be configured of one or more layers to extract feature values of an input image. Although the shared feature extractor may include a convolution layer, a pooling layer and a fully connected layer in an embodiment, it is not necessarily limited thereto and may be configured in a variety of forms according to embodiments.

Specifically, the shared feature extractor may extract a feature vector including one or more feature values of an input image.

In addition, the shared feature extractor is shared among a first classification model, a second classification model and a third classification model and may be used by the first classification model, the second classification model and the third classification model to extract feature values of an input image.

The first classifier may be configured of one or more layers for outputting a classification result of an object included in the input image.

Specifically, the first classifier may output a probability of an object included in the input image to be classified as a specific class among a plurality of classes set in advance, on the basis of the feature values of the input image.

In an embodiment, the computing device 12 may train the first classification model by using a supervised learning technique using a first training dataset.

Specifically, the computing device 12 may train the first classification model, by using an image assigned with a class as an input data of the first classification model and the class assigned to the image as a target data of the first classification model.

For example, the computing device 12 may output a classification result of an object from an input image by using the first classification model and train the first classification model on the basis of the classification result of the object and the class assigned to the input image. At this point, the computing device 12 may update the parameters of the shared feature extractor and the first classifier.

In addition, in an embodiment, the first classification model may further include a global average pooling (GAP) layer for outputting the location of an object in the first input image on the basis of the feature values of the first input image.

The global average pooling layer may filter the feature values of the input image to include the location information of the object.

At this point, the first classification model may output location information of the object using, for example, a class activation map (CAM) algorithm.

Meanwhile, although it is described in the above example that location information of an object is outputted using a class activation map technique, it is not necessarily limited thereto, and the method of outputting location information of an object may be diverse according to embodiments.

For example, the computing device 12 may train the first classification model, by using an image assigned with a class and an image assigned with location information as an input data of the first classification model and using the class and the location information assigned to the image as a target data of the first classification model. At this point, the location information outputted through the class activation map technique may be used as the location information assigned to the image, or the location information may be assigned in a variety of methods.

Specifically, the computing device 12 may train to output location information the same as the location information included in the target data. The computing device 12 may update the parameters of the shared feature extractor, the first classifier and the global average pooling layer by using a first training dataset including an image assigned with a class and an image assigned with location information.

At step 220, the computing device 12 trains the second classification model including the shared feature extractor and a second classifier for outputting a classification result about the authenticity of a second input image on the basis of feature values of the second input image extracted by the shared feature extractor, by using a second training image set including a fake image and a real image.

In an embodiment, the computing device 12 may generate a fake image using a generative model based on a generative adversarial network (GAN).

At this point, the generative model may be a neural network which generates a fake image on the basis of probability distribution of a random latent variable.

Specifically, the computing device 12 may generate a fake image by using the generative model and generate a second training image set by assigning labels of fake and real to the fake image and the real image.

The second classifier may be configured of one or more layers for outputting a classification result about the authenticity of the input image.

Specifically, the second classifier may output a probability of whether the input image corresponds to a fake image or a real image on the basis of the feature values of the input image.

In an embodiment, the computing device 12 may train the second classification model, by using the fake image and the real image as an input data of the second classification model and authenticity corresponding to each of the fake image and the real image as a target data of the second classification model.

For example, the computing device 12 may input a fake image and a real image into the second classification model and output a classification result about the authenticity of the fake image and the real image. At this point, the computing device 12 may compare the outputted classification result and the authenticity of each of the fake image and the real image and update the parameters of the shared feature extractor and the second classifier through the result of the comparison.

In an embodiment, the computing device 12 may train the generative model by using an unsupervised learning algorithm. Specifically, the computing device 12 may train the generative model to generate an image the same as the real image. At this point, the computing device 12 may update the parameters of the generative model on the basis of the classification result outputted from the second classification model.

At step 230, the computing device 12 trains the third classification model including the shared feature extractor and a third classifier for outputting a classification result about a rotation angle of a third input image on the basis of feature values of the third input image extracted by the shared feature extractor, by using a third training image set including images rotated at one or more angles.

The third classifier may be configured of one or more layers for outputting a classification result about the rotation angle of the input image.

Specifically, the third classifier may output a probability of the input image to have been rotated at a specific angle among a plurality of rotation angles on the basis of the feature values of the input image.

In an embodiment, the third classification model may further include an image rotator for generating a third training image set by rotating an image not assigned with a label at one or more angles.

The image rotator may receive an image not assigned with a label and rotate the image at one or more angles. In addition, the image rotator may assign a rotation angle to each rotated image as a label.

In an embodiment, the computing device 12 may train the third classification model using a self-supervised learning algorithm.

Specifically, the computing device 12 may generate images rotated at one or more angles by using the third classification model, and train the third classification model by using the rotated images as an input data of the third model and the rotation angle of each of the rotated images as a target data of the third model.

For example, the computing device 12 may input the rotated images into the third classification model and output a classification result about the rotation angle of each of the rotated images. At this point, the computing device 12 may compare the outputted classification result and the rotation angle of each of the rotated images and update the parameters of the shared feature extractor and the third classification model through the result of the comparison.

Meanwhile, although the method is described as being divided into a plurality of steps in the flowchart shown in FIG. 2, at least some of the steps may be performed in a different order or in combination and together with the other steps, omitted, divided into detailed steps, or performed in accompany with one or more steps not shown in the figure.

Figure 3:
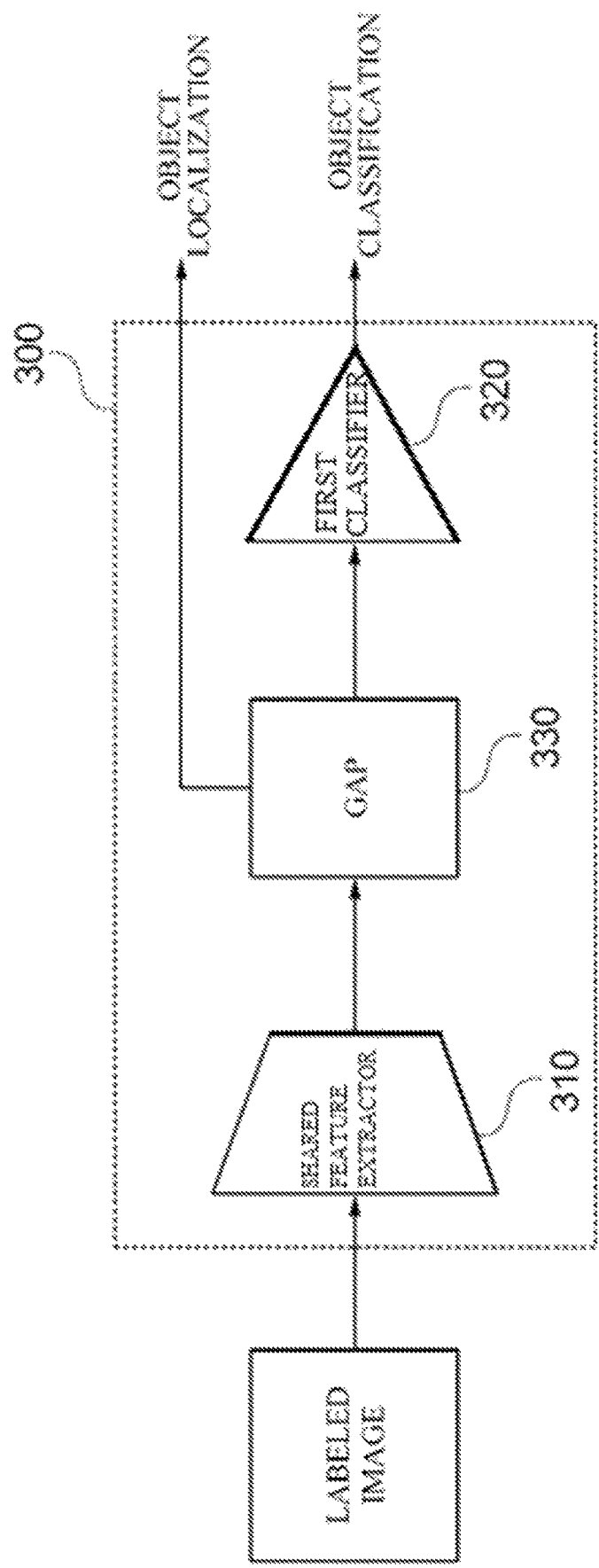
FIG. 3 is a view schematically showing the configuration of a first classification model according to an embodiment.

FIG. 3 is a view schematically showing the configuration of a first classification model according to an embodiment.

Referring to FIG. 3, the first classification model 300 may include a shared feature extractor 310, a main classifier 320, and a global average pooling layer 330.

Specifically, it is assumed that a first training image set including an image assigned with a class and location information is inputted into a first deep neural network model 300.

The shared feature extractor 310 may extract feature values of an inputted image.

The first classifier 320 may output a classification result of an object included in the image on the basis of the feature values of the image.

The global average pooling layer 330 may filter the feature values of the image and output the location information of the object.

At this point, the computing device 12 may calculate a loss function of the first classification model 300 by using the result outputted through the first classifier 310 and the global average pooling layer and the class and the location information assigned to the inputted image.

In an embodiment, the loss function of the first classification model may be a loss function based on cross entropy.

For example, the loss function $L_I$ of the first classification model may be as shown below in Equation 1.

$$L_I = -\sum_{i=1}^{K} y_i \log p(y_i) \quad \text{[Equation 1]}$$

In Equation 1, y denotes a class assigned to the image, i denotes an index of the class, and p(y) denotes a probability of the classification result of an object to be outputted as y.

Meanwhile, although it is described in the above example that the loss function based on cross entropy is set in the first deep neural network model, it is not necessarily limited thereto, and the loss function of the first deep neural network model may be diverse according to embodiments.

Figure 4:
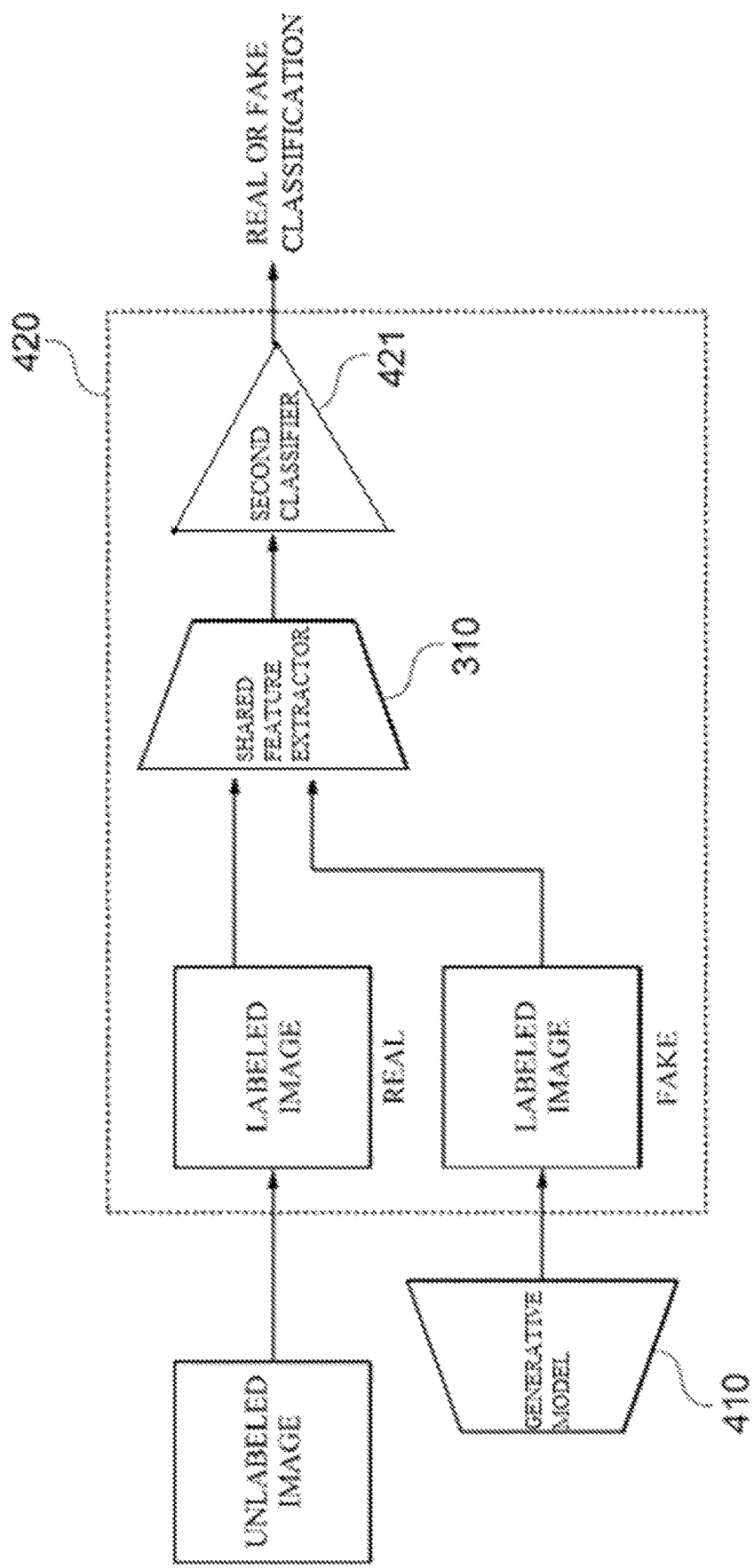
FIG. 4 is a view schematically showing the configuration of a generative model and a second classification model according to an embodiment.

FIG. 4 is a view schematically showing the configuration of a generative model and a second classification model according to an embodiment.

As shown in FIG. 4, the second classification model 420 may be trained together with the generative model 410.

Referring to FIG. 4, the second classification model 420 may include a shared feature extractor 310 and a second classifier 421.

Specifically, the generative model 410 may generate a fake image and determine an image not assigned with a label as a real image.

Then, the second classification model 420 may receive a second training dataset including the fake image and the real image.

The shared feature extractor 310 may extract feature values of the fake image and the real image.

The second classifier 421 may output a classification result about the authenticity of each of the fake image and the real image on the basis of the feature values of the fake image and the real image.

At this point, the computing device 12 may calculate a loss function of the second classification model 420 by using the result outputted through the second classifier 421 and the authenticity corresponding to the fake image and the real image.

For example, the loss function $L_D$ of the second classification model 420 may be as shown below in Equation 2.

$$L_D = -H_X[p(Y)] + \mathbb{E}_{x \sim X}[H[p(y|F(x))]] - \mathbb{E}_{z \sim p(z)}[H[p(y|G(z))]] \quad \text{[Equation 2]}$$

In Equation 2, H denotes the entropy function, E denotes an expectation value of the function, p(y) denotes a probability of the classification result about the authenticity of the fake image and the real image to be outputted as y from the second classifier 512, p(y|F(x)) denotes a probability of the classification result about the authenticity of the real image to be outputted as y from the second classifier 512, p(y|G(z)) denotes a probability of the classification result about the authenticity of the fake image to be outputted as y, x~X denotes a data sampled from the probability distribution of the real image, and z~p(z) denotes a data sampled from a latent space using a Gaussian distribution.

In addition, the loss function $L_G$ of the generative model 410 may be as shown below in Equation 3.

$$L_G = -H_G[p(y)] + \mathbb{E}_{z \sim p(z)}[H[p(y|G(z))]] \quad \text{[Equation 3]}$$

Figure 5:
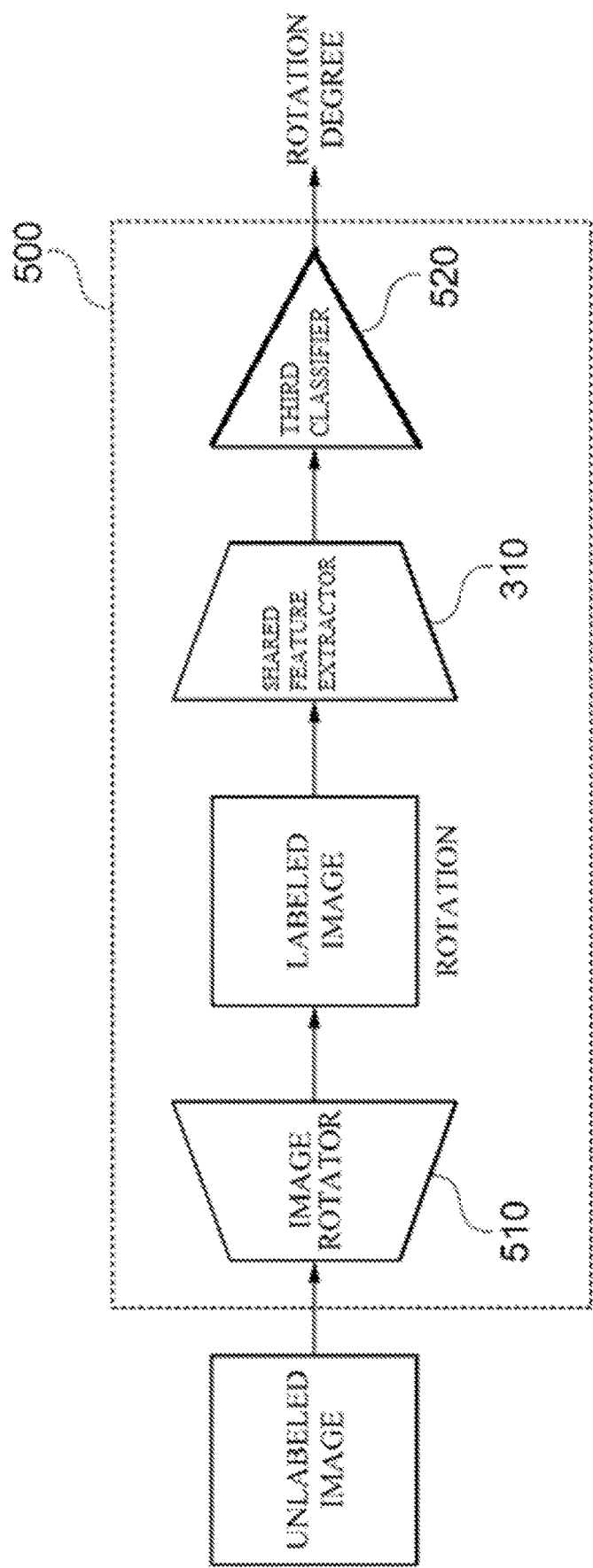
FIG. 5 is a view schematically showing the configuration of a third classification model according to an embodiment.

FIG. 5 is a view schematically showing the configuration of a third classification model according to an embodiment.

Referring to FIG. 5, the third classification model 500 may include an image rotator 510, a shared feature extractor 310, and a third classifier 520.

When an image not assigned with a label is inputted, the image rotator 510 may generate a third training dataset by using the image not assigned with a label. At this point, the third training dataset may include rotated images and rotation angles of the rotated images.

The shared feature extractor 310 may extract feature values of the rotated images.

The third classifier 520 may output a classification result about a rotation angle of a rotated image on the basis of the feature values of the rotated image.

At this point, the computing device 12 may calculate a loss function of the third classification model 500 by using the result outputted through the third classifier 520 and the rotation angle of the image rotated by the image rotator 510.

For example, the loss function $L_R$ of the third classification model 500 may be as shown below in Equation 4.

$$L_R = -\sum_{i=1}^{4} r_i \log p(r_i) \quad \text{[Equation 4]}$$

In Equation 4, r denotes the rotation angle of an image rotated by the rotator 510, and p(r) denotes a probability of the classification result about the rotation angle of the rotated image to be outputted as r from the third classifier 520.

Figure 6:
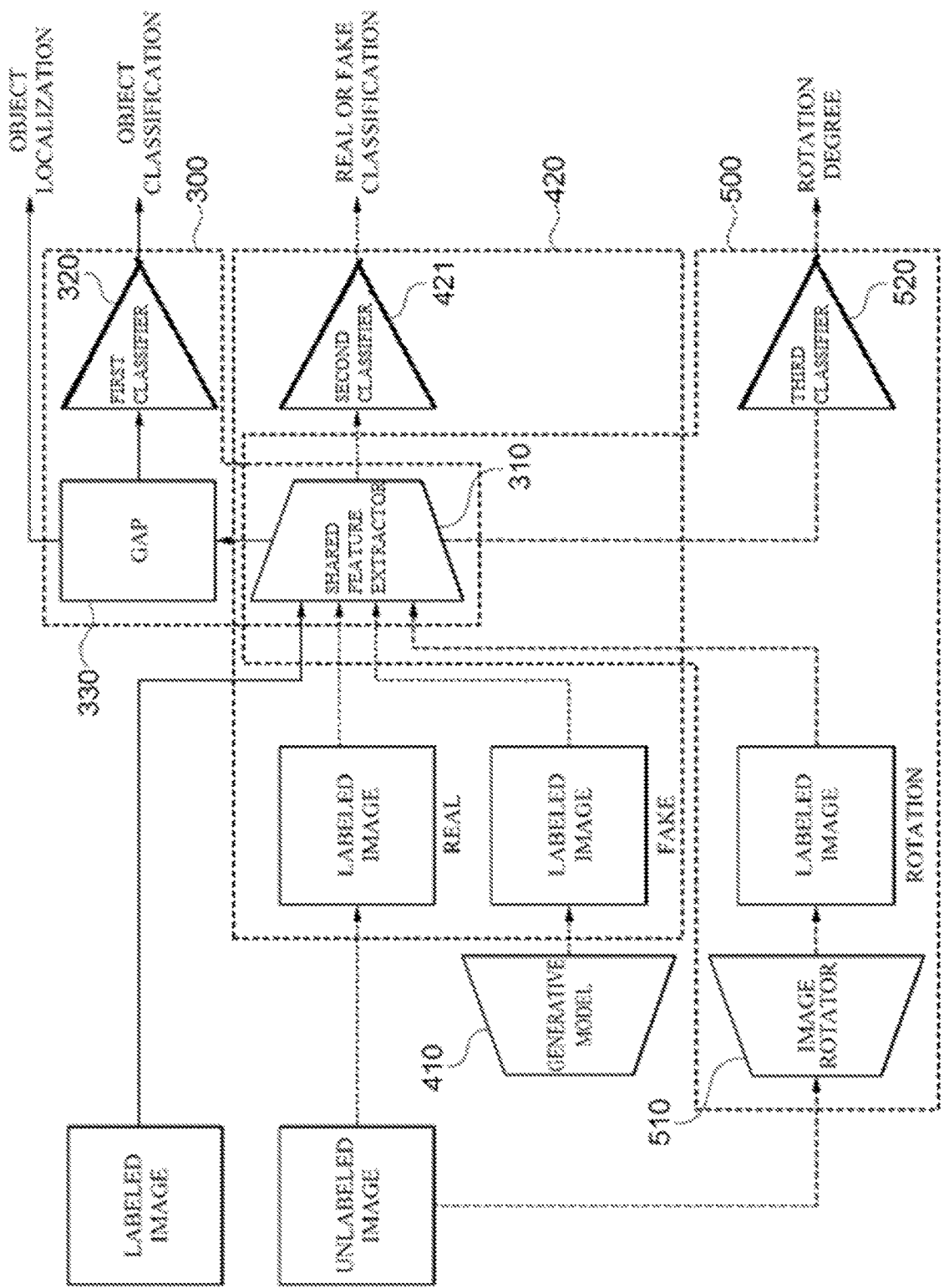
FIG. 6 is a view showing the overall configuration of a first classification model, a second classification model, and a third classification model according to an embodiment.

FIG. 6 is a view showing the overall configuration of a first classification model, a second classification model, and a third classification model according to an embodiment.

Referring to FIG. 6, although the amount of the images assigned with a label is small, the computing device 12 may train the shared feature extractor 310 several times by simultaneously training the first classification model 300, the generative model 410, the second classification model 420, and the third classification model 500.

At this point, although the computing device 12 may train the first classification model 300, the generative model 410, the second classification model 420, and the third classification model 500 by using a round robin method, the method of training each deep neural network model may be diverse according to embodiments.

Specifically, the computing device 12 may individually train the shared feature extractor 310, the first classifier 320, and the global average pooling layer 330 included in the first classification model 300 by using the first training dataset.

After training the first classification model, the computing device 12 may individually train the generative model 410, and the shared feature extractor 310 and the second classifier 421 included in the second classification model 420 by using the second training dataset.

In addition, after training the second classification model, the computing device 12 may individually train the shared feature extractor 310 and the third classifier 520 included in the third classification model 500 by using the third training dataset.

As described above, the computing device 12 may sequentially train the first classification model 300, the generative model 410, the second classification model 420, and the third classification model 500.

Meanwhile, although the computing device 12 may train the first classification model 300, the generative model 410, the second classification model 420, and the third classification model 500 by using the stochastic gradient decent (SGD) algorithm, it is not necessarily limited thereto, and the training method may be diverse according to embodiments.

In addition, in an embodiment, the first classification model 300, the generative model 410, the second classification model 420, and the third classification model 500 may be trained to minimize the weighted sum of the loss function of the first classification model 300, the loss function of the generative model 410, the loss function of the second classification model 420, and the loss function of the third classification model 500.

At this point, the weighted sum of the loss function of the first classification model 300, the loss function of the generative model 410, the loss function of the second classification model 420, and the loss function of the third classification model 500 may be expressed below as shown in Equation 5.

$$L_{total} = \lambda_I L_I + \lambda_{GAN}(L_D + L_G) + \lambda_R L_R \qquad \text{[Equation 5]}$$

At this point, in Equation 5, $\lambda$ denotes the weight value.

Then, the user may determine the first classification model including the shared feature extractor 310, the first classifier 320 and the global average pooling layer 330 as an object detection model.

Accordingly, as a plurality of classification models sharing the shared feature extractor 310 is individually trained, the shared feature extractor 310 may be sufficiently trained several times. In addition, since training may be performed in the second classification model 420 and the third classification model 400 that can perform training by using an image not assigned with a label, performance of the shared feature extractor 310 for extracting features may be enhanced although the amount of images assigned with a label is small.

Meanwhile, although it is described in FIG. 6 that each classification model is trained using a neural network configured of the first classification model, the second classification model and the third classification model, it is not necessarily limited thereto.

For example, a classification model that can perform training by using an image not assigned with a label may be further included, in addition to the first classification model, the second classification model and the third classification model. For example, a classification model performing training by using weakly-supervised learning, semi-supervised learning, self-supervised learning, unsupervised learning or the like may be included.

Meanwhile, the embodiments of the present invention may include programs for performing the methods described in this specification on a computer and computer-readable recording media including the programs. The computer-readable recording media may store program commands, local data files, local data structures and the like independently or in combination. The media may be specially designed and configured for the present invention or may be commonly used in the field of computer software. Examples of the computer-readable recording media include magnetic media such as a hard disk, a floppy disk and a magnetic tape, optical recording media such as CD-ROM and DVD, and hardware devices specially configured to store and execute program commands, such as ROM, RAM, flash memory and the like. An example of the program may include a high-level language code that can be executed by a computer using an interpreter or the like, as well as a machine code generated by a compiler.

The technical features have been described above focusing on embodiments. However, the disclosed embodiments should be considered from the descriptive viewpoint, not the restrictive viewpoint, and the scope of the present invention is defined by the claims, not by the descriptions described above, and all the differences within the equivalent scope should be interpreted as being included in the scope of the present invention.

The invention claimed is:

1. A method of training a model for object classification and detection, the method comprising:

training a first classification model comprising a shared feature extractor shared by a plurality of classification models and a first classifier for outputting a classification result of an object included in a first input image on the basis of feature values of the first input image extracted by the shared feature extractor, using a first training image set including an image assigned with a class;

training a second classification model comprising the shared feature extractor and a second classifier for outputting a classification result about authenticity of a second input image on the basis of feature values of the second input image extracted by the shared feature extractor, by using a second training image set including a fake image and a real image; and training a third classification model comprising the shared feature extractor and a third classifier for outputting a classification result about a rotation angle of a third input image on the basis of feature values of the third input image extracted by the shared feature extractor, using a third training image set including images rotated at one or more angles.

2. The method of claim 1, wherein the training of the first classification model comprises training the first classification model, by using the image assigned with a class as an input data of the first classification model and the class as a target data of the first classification model.

3. The method of claim 2, wherein the first classification model further comprises a global average pooling (GAP) layer for outputting a location of the object in the first input image on the basis of the feature values of the first input image.

4. The method of claim 3, wherein the first training image set further comprises an image assigned with location information, and the training of the first classification model comprises training the first classification model, by using the image assigned with a class and the image assigned with location information as an input data of the first classification model and the class and the location information as a target data of the first classification model.

5. The method of claim 1, wherein the training of the second classification model comprises generating the fake image by using a generative model based on a generative adversarial network (GAN).

6. The method of claim 5, wherein the training of the second classification model comprises training the second classification model, by using the fake image and the real image as an input data of the second classification model and authenticity corresponding to each of the fake image and the real image as a target data of the second classification model, and training the generative model to generate an image the same as the real image.

7. The method of claim 1, wherein the third classification model comprises an image rotator for generating the third training image set by rotating an image not assigned with a label at the one or more angles.

8. The method of claim 1, wherein the training of the third classification model comprises training the third classification model, by using the rotated images as an input data of the third model and a rotation angle of each of the rotated images as a target data of the third model.

9. The method of claim 1, wherein the first classification model, the second classification model, and the third classification model are trained to minimize a weighted sum of a loss function of the first classification model, a loss function of the second classification model, and a loss function of the third classification model.

10. An apparatus for training a model for object classification and detection, the apparatus comprising:
a memory for storing one or more commands; and
one or more processors for executing the one or more commands,
wherein the one or more processors configured to:
train a first classification model comprising a shared feature extractor shared by a plurality of classification models and a first classifier for outputting a classification result of an object included in a first input image on the basis of feature values of the first input image extracted by the shared feature extractor, using a first training image set including an image assigned with a class;
train a second classification model comprising the shared feature extractor and a second classifier for outputting a classification result about authenticity of a second input image on the basis of feature values of the second input image extracted by the shared feature extractor, by using a second training image set including a fake image and a real image; and
train a third classification model comprising the shared feature extractor and a third classifier for outputting a classification result about a rotation angle of a third input image on the basis of feature values of the third input image extracted by the shared feature extractor, using a third training image set including images rotated at one or more angles.

11. The apparatus of claim 10, wherein the one or more processors further configured to train the first classification model, by using the image assigned with a class as an input data of the first classification model and the class as a target data of the first classification model.

12. The apparatus of claim 11, wherein the first classification model further comprises a global average pooling (GAP) layer for outputting a location of the object in the first input image on the basis of the feature values of the first input image.

13. The apparatus of claim 12, wherein the first training image set further comprises an image assigned with location information, and the one or more processors further configured to train the first classification model, by using the image assigned with a class and the image assigned with location information as an input data of the first classification model and the class and the location information as a target data of the first classification model.

14. The apparatus of claim 10, wherein the one or more processors further configured to generate the fake image by using a generative model based on a generative adversarial network (GAN).

15. The apparatus of claim 14, wherein the one or more processors further configured to train the second classification model, by using the fake image and the real image as an input data of the second classification model and authenticity corresponding to each of the fake image and the real image as a target data of the second classification model, and train the generative model to generate an image the same as the real image.

16. The apparatus of claim 10, wherein the third classification model further comprises an image rotator for generating the third training image set by rotating an image not assigned with a label at the one or more angles.

17. The apparatus of claim 10, wherein the one or more processors further configured to train the third classification model, by using the rotated images as an input data of the third model and a rotation angle of each of the rotated images as a target data of the third model.

18. The apparatus of claim 10, wherein the first classification model, the second classification model, and the third classification model are trained to minimize a weighted sum of a loss function of the first classification model, a loss function of the second classification model, and a loss function of the third classification model.

* * * * *